US012576290B2

(12) United States Patent
Kota et al.

(10) Patent No.: US 12,576,290 B2
(45) Date of Patent: Mar. 17, 2026

(54) RESPIRATORY PUMP ARRANGEMENT FOR PERSONAL RESPIRATORY ISOLATION AND METHOD OF USE

(71) Applicant: FlexSys Inc., Ann Arbor, MI (US)

(72) Inventors: Shalini Sarala Kota, Ann Arbor, MI (US); Sridhar Kota, Ann Arbor, MI (US); Kevin Ward, Superior Township, MI (US); David C. Hornick, Ann Arbor, MI (US); Robert Schartow, Ann Arbor, MI (US); James D. Ervin, Ann Arbor, MI (US); Gregory F. Ervin, Ann Arbor, MI (US)

(73) Assignee: FLEXSYS INC., Ann Arbor, MI (US)

( * ) Notice: Subject to any disclaimer, the term of this patent is extended or adjusted under 35 U.S.C. 154(b) by 1025 days.

(21) Appl. No.: 17/545,043

(22) Filed: Dec. 8, 2021

(65) Prior Publication Data

US 2022/0184427 A1 Jun. 16, 2022

Related U.S. Application Data

(60) Provisional application No. 63/123,516, filed on Dec. 10, 2020.

(51) Int. Cl.

*A62B 7/10* (2006.01)
*A42B 1/04* (2021.01)
*A62B 18/00* (2006.01)

(52) U.S. Cl.

CPC .................. *A62B 7/10* (2013.01); *A42B 1/04* (2013.01); *A62B 18/006* (2013.01)

(58) Field of Classification Search

CPC ..... A62B 18/006; A62B 18/084; A62B 18/08; A62B 18/025; A62B 17/04; A62B 23/025;

(Continued)

(56) References Cited

U.S. PATENT DOCUMENTS 4,419,110 A * 12/1983 Ansite .................... B01D 46/00 55/DIG. 35
4,901,716 A * 2/1990 Stackhouse .............. A42C 5/04 128/201.28

(Continued)

FOREIGN PATENT DOCUMENTS

EP 2838387 B1 11/2016
WO 2021202488 A1 10/2021

OTHER PUBLICATIONS

International Preliminary Report on Patentability and Written Opinion for PCT/US2021/062304, mailed Jun. 22, 2023 (9 pages).

*Primary Examiner* — Brandy S Lee
*Assistant Examiner* — Sara K Toich
(74) *Attorney, Agent, or Firm* — Dickinson Wright PLLC

(57) ABSTRACT

A personal respiratory isolation assembly includes a manifold-filter assembly configured to be attached to a suction port of a respiratory pump. The manifold-filter assembly has a bowl-shaped manifold housing with an inlet adapter configured for connecting a hose, and a filter releasably attachable to the manifold housing. The isolation assembly further comprises an exhaust baffle with a plurality of openings. The exhaust baffle fits a pressure port of the respiratory pump. A method of operating a personal respiratory isolation assembly involves attaching an exhaust baffle to an outlet adapter of a respiratory pump; connecting a manifold housing to a suction port of the respiratory pump with a filter disposed between the manifold housing and the suction port; connecting a hose to an inlet adapter of the manifold housing; attaching the hose to a hose port of a hood; and starting to operate the respiratory pump.

17 Claims, 3 Drawing Sheets

(58) Field of Classification Search
CPC ........... A62B 7/10; A62B 18/04; A62B 23/02; A61M 16/009; A61M 16/06; A61B 2218/008; A61B 5/097; A61B 2090/401; B08B 15/007; Y10S 128/91; A41D 13/1161; A41D 13/1138; A41D 13/1153; A42B 1/04; A61G 10/005; A61G 10/02; A61G 10/023; A61F 9/068
See application file for complete search history.

(56) References Cited

U.S. PATENT DOCUMENTS

| | | | | |
|---|---|---|---|---|
| 5,413,097 | A * | 5/1995 | Birenheide | A62B 7/10 128/206.17 |
| 5,526,805 | A | 6/1996 | Lutz et al. | |
| 5,636,627 | A * | 6/1997 | Rochester | A61M 16/009 128/205.27 |
| 5,701,886 | A * | 12/1997 | Ryatt | A61M 16/0816 128/203.29 |
| 2005/0060788 | A1 * | 3/2005 | Green | A62B 18/045 128/201.25 |
| 2007/0235030 | A1 * | 10/2007 | Teetzel | A62B 9/04 128/205.12 |
| 2009/0314295 | A1 | 12/2009 | Hatmaker | |
| 2023/0032878 | A1 * | 2/2023 | Kota | A61B 5/097 |

* cited by examiner

RESPIRATORY PUMP ARRANGEMENT FOR PERSONAL RESPIRATORY ISOLATION AND METHOD OF USE

TECHNICAL FIELD

The present disclosure deals with equipment for preventing exhaled pathogens from entering the surrounding atmosphere. In particular, the present disclosure deals with a pump-operated device for filtering exhaled air before the exhaled air enters the surrounding atmosphere.

BACKGROUND

Patients with infectious respiratory diseases exhale pathogens into the environment. These pathogens may be contained in droplets of such a small size that they remain airborne for an extended period of time, thereby posing a great risk of infecting other individuals inhaling the air in the vicinity of the infected patients.

Protective multi-layer face coverings, including medical masks, provide varying degrees of filtering, but breathing through multiple layers may become burdensome, especially for weakened patients.

Further, personal pump-aided respirator systems have been suggested for protecting a healthy wearer from surrounding airborne pathogens by pumping filtered air into a helmet to create a pressure increase in the helmet that prevents an influx of contaminated air through gaps around the helmet. One example of such a pump-aided respirator system is disclosed in US 2009/0314295 A1, which discloses a pump housing defining an air inlet and an air outlet; a filter assembly covering the air inlet of the housing for removing contaminants from air passing therethrough; an impeller/motor assembly contained within the housing for drawing air through the air inlet and through the filter and expelling the air through the air outlet; and various internal pump components. The pump housing defines a generally cylindrical body enclosing an interior space with a diameter greater than the axial length of the interior space. The air inlet is formed in one axial face of the pump housing and has a cross-section that is commensurate with the interior space of the cylindrical body. The air outlet extends in a tangential direction away from the cylindrical outer wall of the cylindrical body and has a cross-section that is significantly smaller than the cross-section of the air inlet. Further, the air outlet features a threaded adapter for connecting a respiratory hose.

It is further known to build negative-pressure rooms with air pumps removing potentially contaminated air from the room through effective filters so that a vacuum is created that prevents the contaminated air from escaping through other openings, e.g. a temporarily opened entry sluice. Negative-pressure rooms provide about 12 air changes per hour; that is the room air is refreshed every 5 minutes to reduce the contaminated air in the room to protect health care workers from pathogens exhaled by infected patients. Negative-pressure rooms, protect healthcare workers as long as patient remains in the room and thus restrict patient's movements, even if the patient is otherwise ambulatory. Only a limited number of such negative pressure rooms exist even in large well-resourced hospital settings as they are expensive to build.

These measures may be suitable for some situations, but it would be desirable to enable access to an infected patient or transport the patient to test equipment such as a CT-scan without exposing the healthcare provider to the exhaled pathogens and without impeding the mobility and vision of the patient or the health care provider, while allowing the patient to breathe freely or allow visitation without endangering the visitors.

SUMMARY

The present disclosure discusses a personal respiratory isolation assembly comprising a manifold-filter assembly configured to be attached to a suction port of a respiratory pump. The manifold-filter assembly has a bowl-shaped manifold housing with an inlet adapter configured for connecting a hose, and a filter releasably attachable to the manifold housing. The personal respiratory isolation assembly further comprises an exhaust baffle with a plurality of openings. The exhaust baffle is configured to be attached to a pressure port of the respiratory pump. This arrangement converts a respiratory blower into a respiratory vacuum pump.

For facilitating the use of existing equipment, the manifold-filter assembly is preferably configured for retrofitting commercially available respiratory pumps.

Likewise, to facilitate the conversion, the exhaust baffle may comprise a connector portion complementary to the inlet adapter of the manifold housing and capable of forming a mated connection with the inlet adapter. This allows for the use of the same types of hoses as customary for conventional applications.

The exhaust baffle is preferably cup-shaped and the plurality of openings of the exhaust baffle includes openings extending outward in different directions for preventing an obstruction of the exhaust baffle if the assembly is placed on or beside a patient bed.

For optimizing the function of the manifold-filter assembly, the manifold housing preferably has a manifold diameter and a manifold depth, wherein the manifold diameter is greater than the manifold depth. Additionally or alternatively, the inlet adapter has a diameter of a size smaller than or equal to the manifold depth. Further, the bowl-shaped manifold housing may include a cylindrical wall and the inlet adapter may surround an opening in the cylindrical wall.

The filter may include a ring-shaped filter frame and a filter substrate held by the filter frame, wherein the filter frame is configured for being attached to the manifold housing and to the suction port.

A removable plug insert dimensioned to form a seal with the inlet adapter while the personal respiratory isolation assembly is not in use prevents contamination of environmental air with particulates present in the manifold housing.

The personal respiratory isolation assembly may further include a respiratory pump with a pump motor operable to draw air through the inlet adapter and the filter and to expel the air through the exhaust baffle. This is especially beneficial where no respiratory pump is available for being retrofitted.

The hose is preferably equipped with a coupling portion configured to mate with the inlet adapter of the manifold housing.

The personal respiratory isolation assembly may further comprise a hood dimensioned to be placed on a human head, the hood including a clear face shield defining a front area behind the face shield, pliable sides, a pliable top, a hose port, and an internal support structure arranged between the hose port and the front area covered by the face shield, the internal support structure configured to facilitate and air flow from the front area to the hose port.

The internal support structure comprises a porous material, which is a low-cost, highly functional solution, especially if the internal support structure comprises reticulated foam.

An elastic seal disposed along edges of the hood prevents contaminated air to leak out of the hood and also inhibits the entry of environmental air into the hood along the edges of the hood.

Instead, below the face shield, a chin portion comprising breathable material may be disposed to allow air to enter the hood through the chin portion. The chin portion may include filter material for filtering the air entering the hood through the chin portion.

A method of operating a personal respiratory isolation assembly involves the following steps of attaching an exhaust baffle to an outlet adapter of a respiratory pump; connecting a manifold housing to a suction port of the respiratory pump with a filter disposed between the manifold housing and the suction port; connecting a hose to an inlet adapter of the manifold housing; attaching the hose to a hose port of a hood; and starting to operate the respiratory pump.

After conclusion of the operation of the pump, the method may further include the step of inserting a plug insert into the inlet adapter of the manifold housing to form a seal for containing particulates in the manifold housing after the respiratory pump is turned off, thereby creating a particulate-sealed chamber upstream of the filter.

Further details of the present disclosure will be apparent from the following description of the appended drawings. The drawings are provided herewith solely for illustrative purposes and are not intended to limit the scope of the present invention.

DETAILED DESCRIPTION OF THE DRAWINGS

Figure 1:
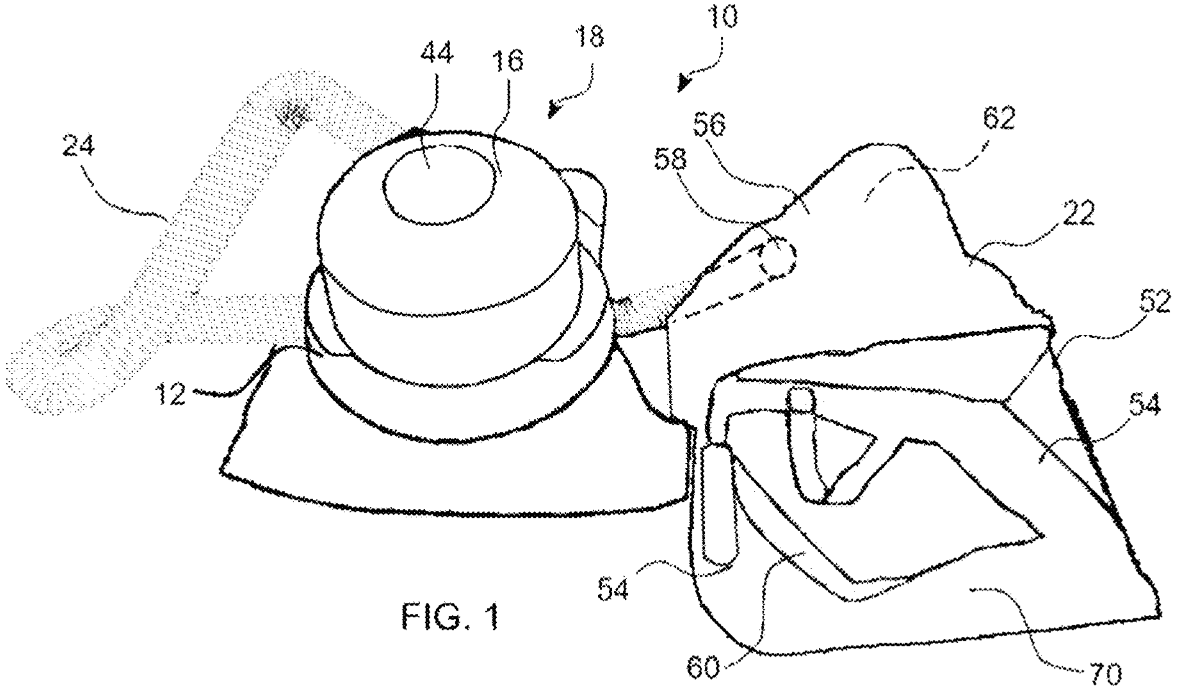
FIG. 1 shows a respiratory isolation assembly according to the present disclosure.

With reference to FIG. 1, a personal respiratory isolation assembly 10 includes a respiratory pump 12, a filter 14 (shown in FIG. 2) in communication with a manifold housing 16, e.g. a manifold-filter assembly 18 composed of the filter 14 and the manifold housing 16, an exhaust baffle 20 (shown in FIG. 2), a personal hood 22 with face shield 52 that is preferably transparent throughout most of its area, and a hose 24 for communicating air exchange between the hood 22 and the manifold housing 16.

The respiratory pump 12 may be configured like the respiratory pump disclosed in US 2009/0314295 A1. It is, however, not critical to use the same pump. Any respiratory pump is adaptable for the purposes of the present disclosure with the additional equipment described below. The present disclosure is rather based on the general concept to reverse the air flow through the hose 24 that connects the respiratory pump 12 with the hood 22.

Figure 2:
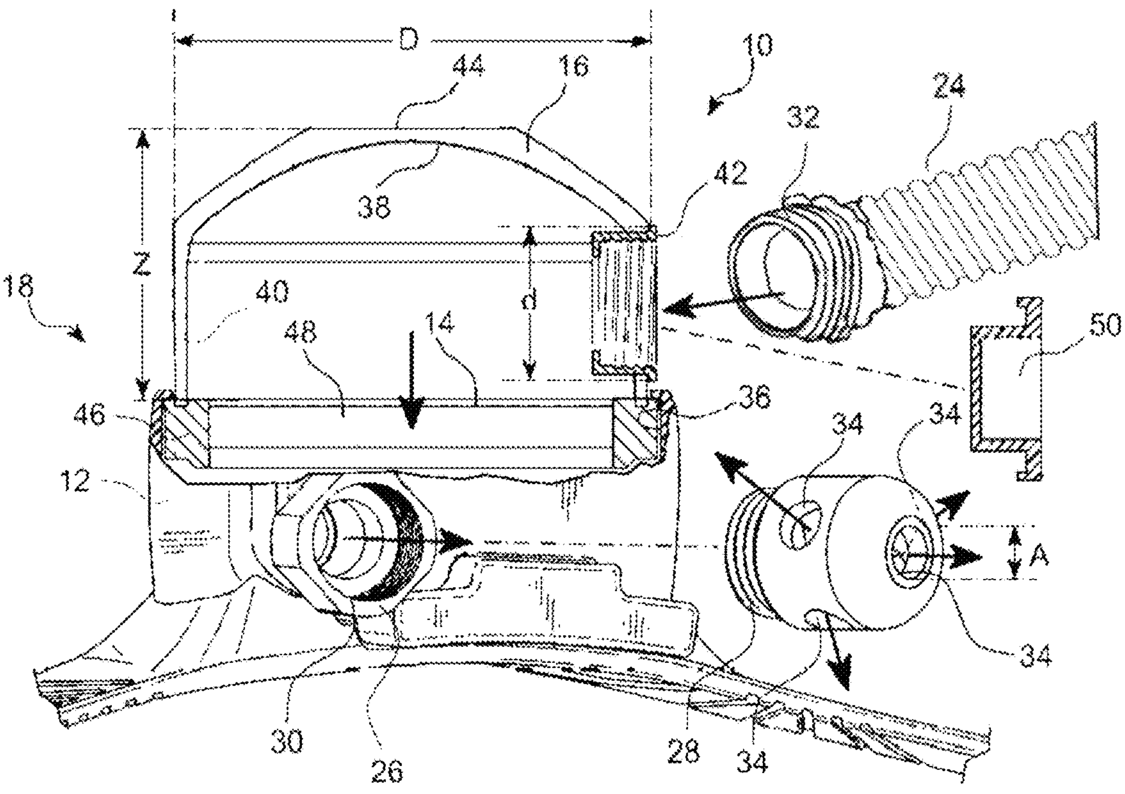
FIG. 2 shows a side view of the respiratory isolation assembly without the hood, with a cross-sectional vertical cut through the manifold and the filter with an additional exhaust baffle to be connected to the respiratory pump.

This becomes evident from FIG. 2. Instead of connecting the hose 24 to the pressure port 26 of the respiratory pump 12, the exhaust baffle 20 is configured to be connected to the pressure port 26 of the respiratory pump 12. For this purpose, the exhaust baffle 20 includes a connector portion 28 that is dimensioned to mate with the outlet adapter 30 at the pressure port 26 of the respiratory pump 12, which, in customary applications, is typically used for connecting a respiratory hose. In the shown example, the connection between the outlet adapter 30 of the respiratory pump 12 and the exhaust baffle 20 is threaded. As shown in the example provided, the connector portion 28 of the exhaust baffle 20 features an external thread that corresponds to a customary external thread forming a coupling portion 32 at the end of a respiratory hose 24, and the outlet adapter 30 of the pressure port 26 of the respiratory pump 12 features an internal thread complementing the external thread of the exhaust baffle 20.

If a different pump with a different type of outlet adapter 30 is used that fits a different coupling portion 32 of a hose 24, the connector portion 28 of the exhaust baffle 20 is adapted to fit the outlet adapter 30 of the respiratory pump 12, corresponding to the coupling portion 32 of a hose 24 suited to be attached to the different type of outlet adapter 24. Such a modification may, for example, involve a reversal of inner and out threads or a bayonet connection.

Figure 5:
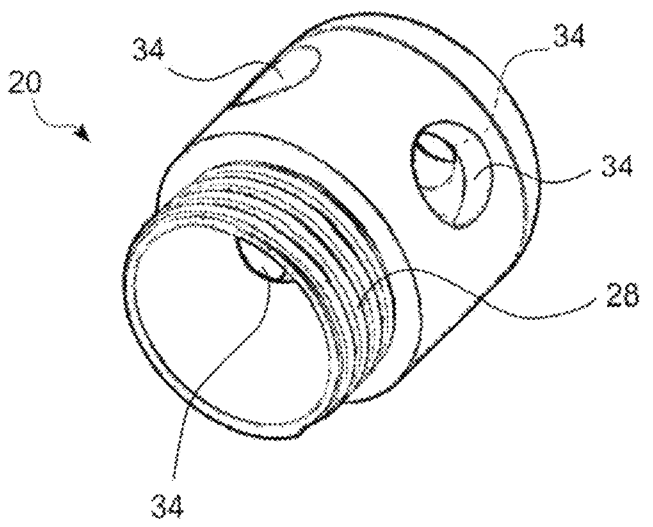
FIG. 5 shows a perspective view of the exhaust baffle with a plurality of openings in different directions.
Figure 6:
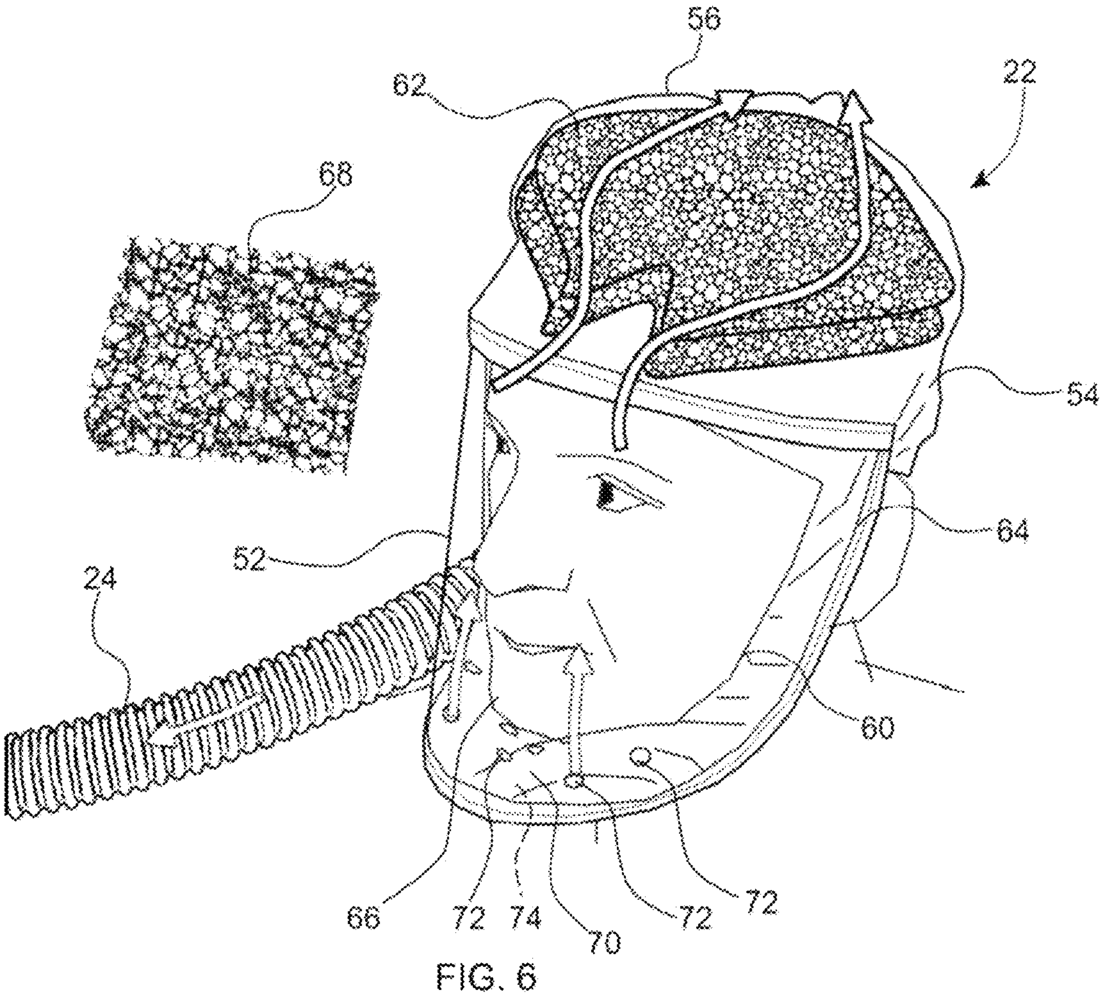
FIG. 6 shows the hood with a schematic illustration of an interior support structure at the top of the hood.

The exhaust baffle 20 is cup-shaped with a plurality of openings 34 in different directions as shown in FIGS. 2 and 5. The openings 34 extending in different directions preferably include a plurality of openings 34 circumferentially distributed around the cylindrical wall of the exhaust baffle 20. at least one of the openings 34 is preferably disposed in the end face of the cup-shaped body of the exhaust baffle 20 opposite from the connector portion 28. Each of the openings 34 has a diameter A of at least 0.5 cm, preferably at least 1 cm. The arrangement of these openings 34 prevents accidental blocking of the exiting air when in use because, even if all but one of the openings 34 are obstructed by a material, air can still be exhausted at a targeted flow rate. It is thus possible to place the respiratory pump 12 on or beside a patient bed (or it can be worn by the patient with an attached belt for mobility as the pump motor runs on a rechargeable battery) without the risk that the pressure port 26 of the respiratory pump 12 is blocked by bedding material. If the outflow is blocked or if the filter is clogged, a standard flow sensor incorporated into the pump system (not shown here) would trigger an alarm.

Referring to FIG. 2 again, the suction port 36 of the respiratory pump 12 is fitted with the manifold-filter assembly 18 composed of the filter 14 and the manifold housing 16. The manifold housing 16 is bowl-shaped, with a diameter D greater than is depth Z. The bowl-shaped manifold housing 16 as shown has an internally domed bottom 38 and a circumferential, generally cylindrical wall 40 with an inlet adapter 42 configured to receive the coupling portion 32 of the hose 24. It is not crucial that the bottom 38 of the bowl-shaped manifold housing 16 is domed because a respiratory pump 12 does not create extreme pressure differences that would require stabilizing vaulted or domed structures. Any vacuum forces generated by a customary respiratory pump 12 can be withstood by a manifold housing 16 made of a hard plastic of appropriate thickness, even with a flat bottom 38. In the shown example, the bottom 38 of the bowl-shaped manifold housing 16 has a flattened end surface 44 on the outside, which facilitates the attachment of a label with, for example, warnings, instructions, or a company logo.

Figure 3:
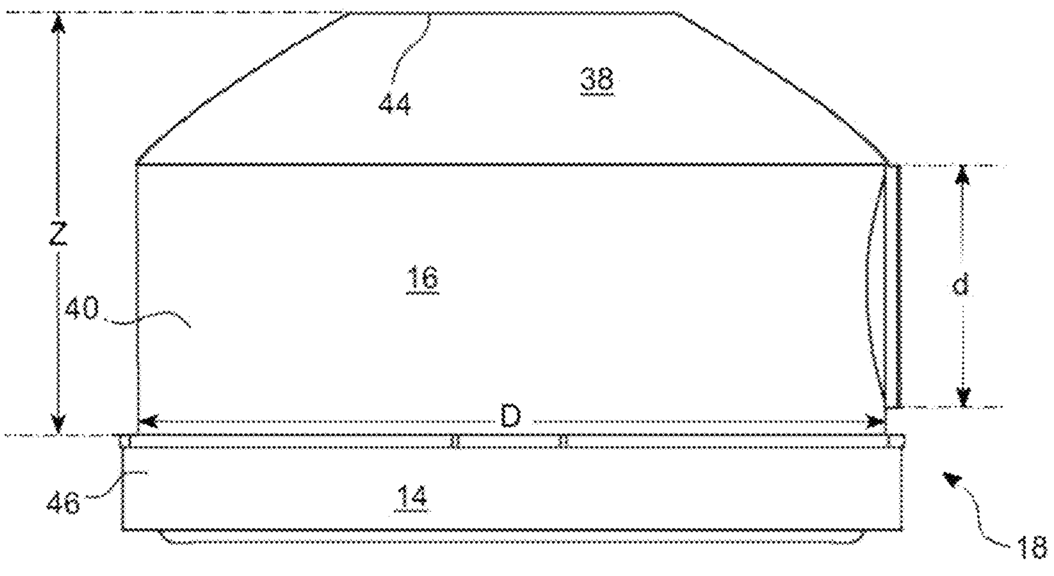
FIG. 3 shows a side view of the manifold-filter assembly with the filter attached to the manifold housing.
Figure 4:
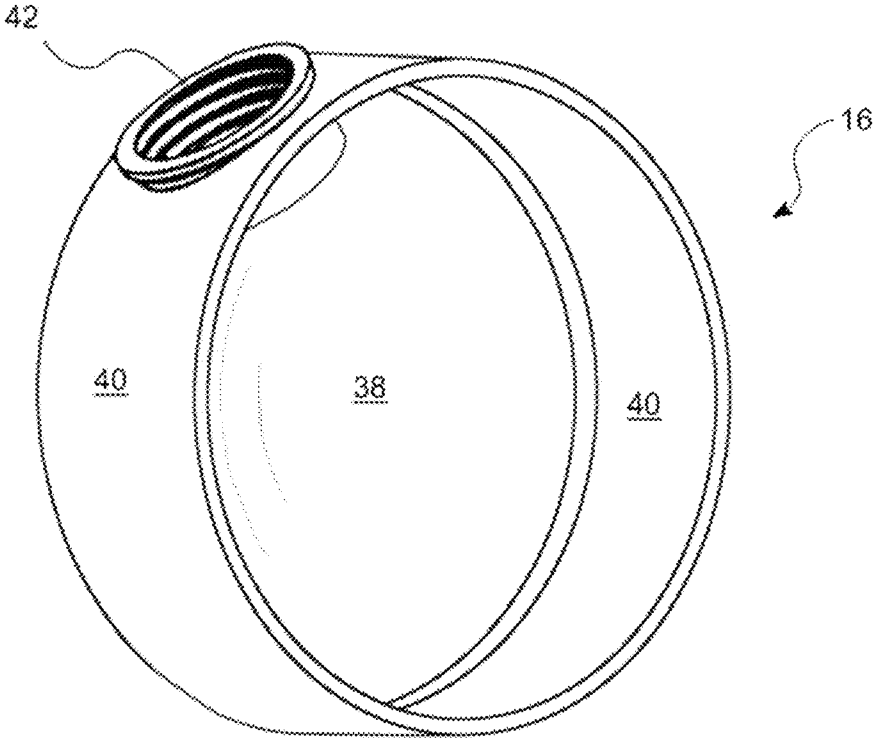
FIG. 4 shows a perspective view of the interior of the manifold housing without the filter.

The depth Z of the manifold housing 16 is at least equal to the diameter d of the inlet adapter 42 to ensure that the inflowing air entering from the hose 24 is able to spread over the entire cross-section of the interior cavity of the manifold housing 16 (see also FIGS. 3 and 4). These proportions provide an optimized utilization of the area of the filter 14, which is removably attached to the manifold housing 16.

The filter 14 includes a ring-shaped filter frame 46 adapted to the shape of the cylindrical wall 40 of the manifold housing 16 as shown in FIG. 2. The filter frame 46 holds a filter substrate 48 extending over the entire open cross-section of the filter frame 46. The filter substrate 48 is chosen to capture targeted materials, such as airborne particulates, including pathogen-loaded droplets and aerosols. In one example, the filter substrate 48 is constructed as a HEPA filter substrate 48. Air exiting the manifold housing 16 via the filter 14 toward the respiratory pump 12 is therefore purified before entering the internal portions of the respiratory pump 12.

In a preferred embodiment, the inlet adapter 42 of the manifold housing 16 is identical to the outlet adapter 30 of the respiratory pump 12 so that the hose 24 may be used in a conventional arrangement (attached to the pressure port 26 of the respiratory pump 12) and also with the manifold housing 16 (at the suction port 36 of the respiratory pump 12). The difference lies in the flow direction of the air flowing through the hose 24. In this preferred configuration of the inlet adapter 42, the connector portion 28 of the exhaust baffle 20 and the inlet adapter 42 of the manifold housing 16 complement each other and are capable of engaging in a mating connection.

The manifold housing 16 is also equipped a plug insert 50 for sealing the inlet adapter 42 when not in use. This plug insert 50 seals contaminants inside the manifold-filter assembly 18 and prevents contamination of the surrounding atmosphere after use. The plug insert 50 may be threaded to sealingly mate with the thread of the inlet adapter 42. Alternatively, the plug insert 50 is made of elastomeric material creating a radial or an axial seal—or both—when pressed into the inlet adapter 42. Because the plug insert 50 is only in use when the respiratory pump 12 is turned off, it does not need to withstand the vacuum forces generated by the operation of the respiratory pump 12.

As seen in FIG. 1, the hose 24 leads to a pliable hood 22, comprising a clear face shield 52, pliable sides 54 and top 56, a hose port 58 near the top 56 of the hood, remote from the face shield 52, and a shape-conforming elastic seal 60 extending along its edges and adapting to the contours of a person's head when worn. Furthermore, the hood 22 includes an internal support structure 62 arranged along the top 56 of the hood 22 between the hose port 58 and a front area covered by the face shield 52 as illustrated in FIG. 5.

The pliable sides 54 and top 56 of the hood 22 are made of a soft textile or plastic material, to which the clear face shield 52 is attached. The clear face shield 52 may be a shape-retaining clear plastic material that need not be rigid and may be, at least to a degree, bendable to adapt its lateral sides 64 to the shape of a patient's head. As visible in FIG. 1, the hose port 58 for attaching the hose 24 is positioned near the top 56 of the hood 22 at a distance from the clear face shield 52 toward the rear of the hood 22. Preferably, the connection of the hose 24 with the hose port 58 is releasable.

With the hose port 58 remote from the face shield 52, the view through the face shield 52 is unobstructed. Because air is exhaled in the vicinity of the face shield 52, however, a flow path for the exhaled air through the hood 22 from the front area 66 in the vicinity of the face shield 52 to the top of the hood 22 needs to be ensured. Thus, the internal support structure 62 at the top 56 of the hood 22 serves two purposes. It prevents a collapse of the pliable hood 22, even under suction. The support structure 62 further provides an air flow path along the top 56 of the hood 22 from the front area 66 behind the face shield 52 to the hose port 58 and thus facilitates the movement of exhaled air from the front area 66 through the hose to the manifold-filter assembly 18.

The support structure 62, best seen in FIG. 5, may have air channels formed on its surface or internally. A low-cost solution consists in forming the support structure 62 from a sheet of reticulated polyurethane foam with a pore size of about 10 ppi to about 20 ppi. The sheet of reticulated foam may have a thickness in the range of about 2 cm though 5 cm. Reticulated foam is made from closed-cell foam or open-cell foam by removing the walls between foam cells in a thermal or chemical process. This leaves behind a three-dimensional skeleton of webs 68 that allow a nearly free flow of air through the support structure while providing a firm support for the hood 22. Alternatively or additionally, the support structure 62 may include unreticulated open-pore foam, a flexible plastic body, a wire support structure or one or more tubes.

A chin portion 70 of the hood 22, extending below the face shield 52, between the face shield 52 and the seal, is preferably made of breathable material for allowing air to enter the hood 22. This may be accomplished by providing openings 72 in the chin portion 70 below the face shield 52. Alternatively or additionally, the breathable material may be formed by or with a filter material, e.g. a HEPA filter, suited for purifying air entering the hood 22. For that purpose, a filter pocket 74 may be formed by the chin portion 70 with the openings 72 in the chin portion 70 providing a flow path for the filtered air entering the interior of the hood 22.

In particular with the use of the filter material in the chin portion 70, the seal 60 along the edges of the hood 22 serves the purpose of closing off alternative pathways for air entering the hood 22. That way, all, or at least over 90% of the air entering the hood 22 is purified. If the seal 60 along the edges of the hood 22 allows a small amount of unfiltered air to enter the interior space of the hood 22, the suction applied to the hose port 58 directs the entering air towards the hose port 58, away from a wearer's nose or mouth.

The equipment described above is configured for carrying out a method for preventing air containing particulates from contaminating the environment and also optionally from contaminating the interior space of the hood 22 while being worn with the filter material inserted in the chin portion 70. The hood thus helps protect health care workers from inhaling contaminated air exhaled by the patient when the hood 22 is worn by a patient with infectious respiratory disease and also protects the patient from inhaling contaminated air from the environment. Conversely, the hood 22 may also be worn by a healthcare worker to protect patients from inhaling contaminated air exhaled by the healthcare worker.

The method involves attaching the exhaust baffle 20 to the outlet adapter 30 of the respiratory pump 12, connecting the filter 14 to the manifold housing 16 to form the manifold-filter assembly 18; connecting the manifold-filter assembly 18 to the suction port 36 of the respiratory pump 12; connecting the hose 24 to the inlet adapter 42 of the manifold housing 16; attaching the hose 24 to the hose port 58 near the top 56 of the hood 22, and starting to operate the respiratory pump 12.

The respiratory pump 12 draws air from the hood 22 through the hose 24 and through the manifold-filter assembly 18, and expels the filtered air through the exhaust baffle 20. When the hood 22 is placed on a patient's head, the support structure 62 inside the hood 22 provides an air flow path from the front area 66 behind the face shield 52 to the hose port 58 near the top 56 of the hood 22.

After use, for containing particulates from contaminating the environment, the method involves inserting a plug insert 50 into the inlet adapter 42 of the manifold-filter assembly 18 to form a seal after the respiratory pump 12 is turned off, thereby creating a particulate-sealed chamber upstream of the filter 14.

While the above description pertains to the preferred embodiments of the present invention, the invention is susceptible to modification, variation and change without departing from the proper scope and fair meaning of the accompanying claims.

What is claimed is:

1. A personal respiratory isolation assembly comprising:

a manifold-filter assembly configured to be attached to a suction port of a respiratory pump, the manifold-filter assembly having a bowl-shaped manifold housing with an inlet adapter configured for connecting a hose, and a filter releasably attachable to the manifold housing; and an exhaust baffle with a plurality of openings, the exhaust baffle configured to be attached to a pressure port of the respiratory pump wherein the exhaust baffle comprises a connector portion complementary to the inlet adapter of the manifold housing and capable of forming a mated connection with the inlet adapter.

2. The personal respiratory isolation assembly of claim 1, wherein the manifold-filter assembly is configured for retrofitting commercially available respiratory pumps.

3. The personal respiratory isolation assembly of claim 1, wherein the exhaust baffle is cup-shaped and the plurality of openings of the exhaust baffle includes openings extending outward in different directions.

4. The personal respiratory isolation assembly of claim 1, wherein the manifold housing has a manifold diameter and a manifold depth, wherein the manifold diameter is greater than the manifold depth.

5. The personal respiratory isolation assembly of claim 4, wherein the inlet adapter has a diameter of a size smaller than or equal to the manifold depth.

6. The personal respiratory isolation assembly of claim 1, wherein the bowl-shaped manifold housing includes a cylindrical wall and the inlet adapter is formed inside an opening in the cylindrical wall.

7. The personal respiratory isolation assembly of claim 1, wherein the filter includes a ring-shaped filter frame and a filter substrate held by the filter frame, wherein the filter frame is configured for being attached to the manifold housing and to the suction port.

8. The personal respiratory isolation assembly of claim 1, further comprising a removable plug insert dimensioned to form a seal with the inlet adapter while the personal respiratory isolation assembly is not in use.

9. The personal respiratory isolation assembly of claim 1, further comprising a respiratory pump with a pump motor operable to draw air through the inlet adapter and the filter and to expel the air through the exhaust baffle.

10. The personal respiratory isolation assembly of claim 1, further comprising the hose with a coupling portion configured to mate with the inlet adapter of the manifold housing.

11. The personal respiratory isolation assembly of claim 9, wherein the exhaust manifold is selectively attachable to the pressure port of the respiratory pump.

12. The personal respiratory isolation assembly of claim 1, further comprising a hood dimensioned to be placed on a human head, the hood including a clear face shield defining a front area behind the face shield, pliable sides, a pliable top, a hose port, and an internal support structure arranged between the hose port and the front area covered by the face shield, the internal support structure configured to facilitate and air flow from the front area to the hose port.

13. The personal respiratory isolation assembly of claim 12, further comprising the hose, wherein the hose establishes a fluid communication between the inlet port of the manifold housing and the hose port of the hood.

14. The personal respiratory isolation assembly of claim 12, wherein the internal support structure comprises a reticulated foam.

15. The personal respiratory isolation assembly of claim 12, further comprising an elastic seal disposed along edges of the hood.

16. The personal respiratory isolation assembly of claim 12, further comprising a chin portion beneath the face shield, the chin portion comprising breathable material to allow air to enter the hood through the chin portion.

17. The personal respiratory isolation assembly of claim 16, wherein the chin portion includes filter material for filtering the air entering the hood through the chin portion.

* * * * *